United States Patent [19]

Smits et al.

[11] Patent Number: 5,281,632

[45] Date of Patent: Jan. 25, 1994

[54] CELLULAR POLYMER CONTAINING PERFORATED CELL WINDOWS AND A PROCESS FOR THE PREPARATION THEREOF

[75] Inventors: Guido F. Smits, Wijnegem, Belgium; Johan A. Thoen, Terneuzen, Netherlands

[73] Assignee: The Dow Chemical Company, Midland, Mich.

[21] Appl. No.: 81,922

[22] Filed: Jun. 22, 1993

Related U.S. Application Data

[63] Continuation of Ser. No. 951,970, Sep. 28, 1992, Pat. No. 5,250,579.

[51] Int. Cl.$^5$ .............................................. C08J 9/40
[52] U.S. Cl. ..................................... 521/132; 521/134; 521/136; 521/137; 521/138; 521/908
[58] Field of Search ............... 521/132, 134, 136, 137, 521/138, 908

[56] References Cited

U.S. PATENT DOCUMENTS 3,753,933 8/1973 Olstowski et al. ................. 521/170

FOREIGN PATENT DOCUMENTS 0224945 6/1987 European Pat. Off. ..

*Primary Examiner*—Morton Foelak

[57] ABSTRACT

A process for preparing a cellular polymer containing perforated cell windows in the presence of a perforating agent being a substance that has a critical surface free energy of less than about 23 mJ/m$^2$ is disclosed. The cellular polymers obtained according to this invention have a fine cell structure and show enhanced dimensional and thermal insulation stability. The invention also relates to rigid polyurethane foam prepared in the presence of, for example, particulate poly(tetrafluoroethylene) or a liquid polyfluoro- or perfluorocarbon, with a boiling point of at least 130° C., as perforating agent.

13 Claims, No Drawings

CELLULAR POLYMER CONTAINING PERFORATED CELL WINDOWS AND A PROCESS FOR THE PREPARATION THEREOF

CROSS-REFERENCE TO RELATED APPLICATION

This is a continuation of application Ser. No. 07/951,970 filed Sep. 28, 1992, U.S. Pat. No. 5,250,579.

FIELD OF THE INVENTION

This invention relates to a process for preparing a cellular polymer containing perforated cell windows.

BACKGROUND OF THE INVENTION

Cellular polymers such as, for example, polyethylene, polystyrene, or polyurethane are of value in many application areas including notably thermal insulation. In this case it is particularly advantageous that such foam exhibits attractive dimensional stability and a relatively stable thermal insulation performance. Both of these trails are largely determined by the cellular structure of the foam and by the composition of the gas(es) within the cell cavity. A finer cell structure generally confers better insulation properties to a foam. However, as cells become finer, that is of small diameter, the compressive strength and dimensional stability of the foam frequently becomes inferior. Susceptibility to poor dimensional stability is greater when the cell cavity contains a gas which is likely to condense or alternatively diffuse out of the cell. Either phenomenon leads to a loss of partial gas pressure within the cell, resulting in poor dimensional stability of the foam. Exemplary of a cell gas noted to diffuse out of a cell cavity, especially of polyurethane, is carbon dioxide. The use of carbon dioxide to prepare cellular polymers and especially polyurethane is presently highly favored as a substitute for many of the commonly used physical blowing agents considered harmful to the ozone layer.

In support of this trend there exists a need to develop an improved process for the preparation of cellular polymers which exhibit attractive dimensional stability and thermal insulation properties. Particularly for polyurethane foam, there exists a need for a process which permits the use of, for example, water-generated carbon dioxide and yet provides for a foam having a commercially acceptable dimensional stability and thermal insulation performance.

From the general understanding of foam morphology and the formation of fine celled polymers it is to be appreciated that as the average cell size decreases the closed cell content of the foam becomes significant. A cell is comprised of a plurality of struts and corners defining a plurality of window regions. By "closed cells" it is generally understood that the window regions are completely sealed by a membrane thereby providing an isolated cell cavity. A high closed cell content frequently results in poor dimensional stability of the foam.

A potential solution to the dimensional stability problem is to provide a foam with an open-celled structure. That is a structure where one or more of the cell windows are completely open and not sealed by a membrane. Such open cells can not suffer from loss of partial pressure and ensuing poor dimensional stability. Expanded polymer having an open celled structure may be prepared by crushing the expanded polymer after its preparation to break cell windows. The latter means is only available for elastomeric polymers since crushing of rigid cellular polymers would lead to permanent deformation and damage. To provide for cell opening in a rigid polymer use of a cell opening agent during the process of its manufacture is required. Typically such cell opening agents are high boiling liquids such as for example high molecular weight poly(oxyalkylene) adducts. However, a disadvantage associated with the use of such cell opening agents is that they generally promote the formation of polymer containing a coarse cell structure and consequently unattractive thermal insulation properties.

Thus there exists a need to provide a foam having an "open-cell trait" regarding dimensionally stability but which retains a fine cell structure. To this purpose, the concept of preparing foam with a perforated cell window has been investigated. By "perforated" it is to be understood that the cell windows retain a membrane contacting the struts and corners, but that such membrane has voids within it, that is "pin-holes" or perforations. Thus there exists a need to discover substances which are capable of providing a perforated cell membrane and yet which do not particularly provide an open-cell structure. From a theoretical consideration, it is necessary to discover substances which are capable of promoting a localized perturbation leading to "pinhole" formation within the cell membrane. Again from a theoretical consideration, substances mostly likely to promote a localized perturbation are those substances which have little or no interaction, physical or chemical, with the cellular polymer. Substances noted for having little or no interaction with their environment include for example poly(tetrafluoroethylene), or "PTFE".

EP-224,945-A discloses a polyurethane foam prepared in the presence of from 25 to 60 parts by weight per 100 parts of polyol of particulate PTFE having a particle diameter of 25 microns or less. U.S. Pat. No. 3,753,933 discloses a polyurethane foaming process in the presence of as little as 9 parts/100 parts polyol of a larger sized PTFE particle. However it is to be noted that use of large sized particles or high loadings in a polyurethane foaming process are not easily processed due to viscosity constraints or and provide foam with an undesirably course, open-celled structure.

SUMMARY OF THE INVENTION

In a first aspect, this invention relates to a process for preparing a cellular polymer containing perforated cell windows wherein the polymer is prepared in the presence of perforating agent characterized in that the perforating agent, present in from about 0.01 to about 1.0 percent based on total weight of polymer, is a substance that has a critical surface free energy of less than about 23 $mJ/m^2$ and which when a solid has an average particle size of about 20 microns or less, and when a liquid has a boiling point greater than the maximum temperature encountered during the process of preparing the polymer.

In the second aspect, this invention relates to a polyurethane precursor composition comprising a polyurethane precursor, being a polyisocyanate or a substance containing isocyanate-reactive hydrogen atoms, and a perforating agent characterized in that the perforating agent is present in from about 0.01 to about 2.0 percent based on total weight of precursor and perforating agent present, and in that said perforating agent is a substance that has a critical surface free energy of less than about 23 mJ/m$^2$ and which when a solid has an average particle size of about 20 microns or less, and when a liquid has a boiling point of greater than 130° C.

In a third aspect, this invention relates to a cellular polymer prepared according to the above mentioned process.

DETAILED DESCRIPTION OF THE INVENTION

In accordance with this invention, a cellular polymer having perforated cell windows is obtained by a process which employs a selected perforating agent that can be a particulate solid or a liquid. The polymer can be a thermoplastic or thermoset polymer including, for example, a polyethylene, a polystyrene, a polyester, a polyether, a polyamide, a phenolformaldehyde resin or especially a polyurethane polymer. In the case of polyurethane polymer, this invention is particularly of value when preparing cellular thermoset polyurethanes that can be flexible, semi-rigid or, preferably, rigid polyurethane foams.

The perforating agent is a substance which is essentially chemically inert under the conditions of preparing the cellular polymer and which has a critical surface free energy of less than about 23, preferably less than about 20, and more preferably less than about 18.5 mJ/m$^2$. Use of a substance with a higher critical surface free energy generally will not provide a perforated cell window. An explanation of critical surface free energy is provided on page 425 and following pages of the 1983 publication, "CRC Handbook of Solubility Parameters and other Cohesion Parameters" by A. F. M. Barton published by CRC Press Inc.; ISBN 0-8493-3295-8, incorporated herein by reference. In the case of liquid perforating agents it is to be appreciated that the critical free surface energy is temperature dependent, as the temperature increases generally the critical free surface energy decreases. Accordingly, suitable liquid perforating agents for use in this invention are those which on exposure to an elevated process temperature have a critical surface free energy or less than about 23 mJ/m$^2$ the elevated temperature and preferably those which have a critical surface free energy of less than about 23 mJ/m$^2$ at room temperature.

When a solid, the perforating agent has a particle size commensurate with the thickness of the membranes occupying the window regions of the cell. Typically the average particle size is less than about 20, preferably less than about 15, more preferably less than about 10, and most preferably less than about 3 microns. With an average particle size of about 10 microns, advantageously the distribution is such that at least 90 percent of the particles are of 10 micron or less; and with an average particle size of about 3 microns or less than at least about 90% of the particles are of less than about 6 microns and at least 10% of the particles are less than 1 micron. Such particle sizes and distribution can be determined by conventional laser, non shear, techniques using equipment such as the Malvern Laser Diffraction Analyzer. It is further advantageous if the particle has a specific surface area of at least 3, preferably at least 4.5 and more preferably at least 6.5 m$^2$/g as determined by krypton absorption. Exemplary of suitable solid, particulate perforating agents include fluorinated polymers comprising poly(trifluoroethylene) with a critical surface energy of 22 mJ/m$^2$; poly(hexafluoropropylene), 16.2 mJ/m$^2$; poly(1,1-dihydro-perfluorooctyl methacrylate), 10.6 mJ/m$^2$; and especially poly(tetrafluoroethylene), 18.5 mJ/m$^2$. Particulate PTFE suitable for use in this invention is available commercially and includes products designated by the trademark FLUOROGLIDE available from ICI such as FL1710 and FL 1200, and products available from Dupont under the trademark TEFLON including TEFLON MP 1100, TEFLON MP 1200, MP 1300 and MP 1500.

When a liquid, the perforating agent advantageously has a boiling point at atmospheric pressure which is greater than the maximum process temperature encountered during the preparation of the cellular polymer. If the liquid perforating agent has a boiling point significantly less than the maximum process temperature, it will function not as a perforating agent but as blowing agent. By "significantly less" it is understood a boiling point which is at least 10° C. below the maximum process temperature. Preferably the boiling point is at least 20° C. below the maximum process temperature. Typical process temperatures can be, for an extrusion process of a thermoplastic polymer, at least 100° C. or higher. Alternatively, such a process may be a reactive molding process such as employed in the preparation of thermoset polymer, notably polyurethane. Accordingly, suitable liquid perforating gents include those substances which advantageously have an atmospheric boiling point of at least 100° C., preferably at least 130° C. and more preferably at least 150° C. and most preferably at least 175° C. and which are insoluble or only sparingly soluble in the polymer or precursors thereof. Suitable liquid perforating agents include organic polyfluoro- and especially perfluorocarbon compounds which advantageously have an average molecular weight of at least 350 and preferably at least 400. Exemplary of suitable liquid perforating agents include the fluorinated organic compounds marketed by 3M under the trademark FLUORINERT including substances identified as FC-104, FC-75, FC-40, FC-43, FC-70, FC-5312 and FC-71, and substances marketed by Rhone-Poulenc under the trademark FLUTEC including substances identified as PP3, PP6, PP7, PP10, PP11, PP24 and PP25. Such liquid perforating agents typically have a critical free surface energy of from about 9 to about 16 mJ/m$^2$ at room temperature.

When the perforating agent is a solid, it preferably is present in from about 0.05 to about 0.75, and more preferably in from about 0.05 to about 0.5 percent based on total weight of cellular polymer. When the perforating agent is a liquid, preferably it is present in from about 0.01 to about 0.6, more preferably from about 0.01 to about 0.5 and most preferably in from about 0.01 to about 0.2 percent. In the present invention, use of liquid perforating agent is preferred over a solid perforating agent as it is easier to introduce into the process when preparing a cellular polymer. Additionally, the liquid perforating agent can be employed in smaller quantities than a solid agent to obtain the same technical effect. Combinations of solid and liquid perforating agents may also be used.

In a preferred embodiment, this invention relates to cellular polyurethane polymers. Cellular polyurethane polymers are generally obtainable by contacting under reaction conditions, in presence of said perforating agent and advantageously a blowing agent, polyurethane precursor materials including polyisocyanate and a substance containing one or more isocyanate-reactive hydrogen atoms. Substances containing isocyanate-reactive hydrogen atoms include alcohols, polyester polyols, polyether polyols, and primary or secondary amine-terminated polyethers, or mixtures thereof. The perforating agent may be added independently to the reacting mixture or preblended with a polyurethane precursor. When preblended with a polyurethane precursor, the amount of perforating agent present in such to provide, after dilution by other reactants, a cellular polymer containing the already mentioned amount of perforating agent. Typically, the amount of perforating agent present with a polyurethane precursor will be from about 0.01 to about 2, preferably from about 0.01 to about 1.5, and more preferably from about 0.01 to about 1.0 percent based on total weight of polyurethane precursor and perforating agent present.

Suitable polyisocyanates include aromatic, aliphatic and cycloaliphatic polyisocyanates and combinations thereof. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude methylene diphenylamine. The preferred polyisocyanates are disclosed in U.S. Pat. No. 3,215,652, incorporated herein by reference. Especially preferred are methylene-bridged polyphenyl polyisocyanates and mixture thereof with crude diphenylmethane diisocyanate, due to their ability to cross-link the polyurethane. The amount of polyisocyanate present when preparing the polyurethane foam is such to provide from about 0.6 to about 3.0 isocyanate groups per isocyanate reactive atom present in the polyol(s) and any water as may be present. Preferably the amount of isocyanate is such to provide from about 0.7, more preferably from about 0.8, and preferably up to about 2, more preferably up to about 1.6 isocyanate groups per isocyanate reactive atom.

Suitable polyols include those as are conventionally used in the preparation of rigid polyurethane foam and which typically have an average hydroxyl equivalent weight of from about 50 to about 700, preferably from about 70 to about 500, more preferably from about 70 to about 300. Additionally, such polyols will generally contain from about 2 to about 8, preferably from about 3 to about 8, and more preferably from about 3 to about 6 hydroxyl groups per molecule. Examples of suitable polyols are polyether polyols as described more fully in U.S. Pat. No. 4,394,491 and incorporated herein by reference. Exemplary of such polyether polyols include those commercially available under the trademark, VORANOL and include VORANOL 202, VORANOL 360, VORANOL 370, VORANOL 446, VORANOL 490, VORANOL 575, VORANOL 640, VORANOL 800 all sold by The Dow Chemical Company. Other preferred polyols include alkylene oxide derivatives of Mannich condensate as taught in, for example, U.S. Pat. Nos. 3,297,597; 4,137,265 and 4,383,102 and incorporated herein by reference, and amino-alkylpiperazine-initiated polyether polyols as described in U.S. Pat. Nos. 4,704,410 and 4,704,411 also incorporated herein by reference. A group of polyester polyols suitable for use in this invention when a foaming process displaying thixotropic properties is required include those which are essentially a solid at room temperature. Advantageously, the polyester polyol has a melting point within the range of from about 50° C. to about 115° C., and preferably from about 55° C. to about 100° C. Typically such polyester polyol has an average molecular weight of from about 2000 to about 6000, preferably from about 2500, and more preferably from about 3000 and preferably up to about 5000, more preferably up to about 4500. Exemplary of such a polyester polyol is Dynacoll TM 7360, a polyhexamethylene-adipate polyol, of molecular weight 3500 and melting point 60° C., available from Hüls AG.

Advantageously, when preparing a cellular polymer according to this invention there is present a blowing agent. The blowing agent is present in an amount to provide the cellular polymer with an overall density of typically from about 10 to about 150, preferably from about 10 to about 100, and more preferably from about 15 to about 80 kg/m$^3$. Suitable blowing agents include, for example, alkanes such as pentane, hexane or a halogen-containing substances such as (per)fluorocarbons and the hydrogen-containing chlorofluorocarbon compounds exemplary of which include Refrigerant 21, Refrigerant 22, Refrigerant 123, Refrigerant 123a, Refrigerant 124, Refrigerant 124a, Refrigerant 133 (all isomers), Refrigerant 134, Refrigerant 141b, Refrigerant 142, Refrigerant 151. Among these, Refrigerant 123 (all isomers), Refrigerant 141b and Refrigerant 142 (all isomers) are most preferred, as these are commercially available in addition to being recognized as having low ozone depletion potentials. Other blowing agents also include the amine/carbon dioxide complexes such as taught in U.S. Pat. Nos. 4,735,970 and 4,500,656; incorporated herein by reference.

When preparing polyurethane foam advantageously the blowing agent comprises water. Water react with the polyisocyanate leading to the in situ generation of nascent carbon dioxide causing the reacting means to expand and acquire a reduced density. Typically, water is present in an amount to provide for at least 50, preferably at least 75, and up to 100 mole percent of the blowing requirement to obtain a polyurethane foam of said density. In a highly preferred embodiment of this invention, the polyurethane blowing agent consists essentially of water. Typically for this purpose, the amount of water present is from about 0.5 to about 15, preferably from about 2.0, more preferably from about 3.0, and preferably up to about 10, more preferably up to about 8 parts per 100 parts by weight of polyol Optionally other ingredients may be present when preparing the polyurethane foam. Among these other ingredients are catalysts, surfactants, colorants, antioxidants, reinforcing agents, fillers, antistatic agents and flame retardants. Suitable flame retardants include phosphorus containing substances such as tris(-chloroalkyl)phosphate and trisalkylphosphates, for example triethylphosphate; and nitrogen containing substances such as melamine.

One or more catalysts for the reaction of the active hydrogen-containing compound with the polyisocyanate are advantageously present. Suitable catalysts include tertiary amine compounds and organometallic compounds. Exemplary tertiary amine catalysts include triethylenediamine, N-methylmorpholine, pentamethyldiethylenetriamine, tetramethylethylenediamine, 1-methyl-4-dimethylaminoethylpiperazine, 3-methoxy-N-dimethylpropylamine, N-ethylmorpholine diethylethanolamine, N-cocomorpholine, N,N-dimethyl-N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates and formation of polyisocyanurate polymers, such as an alkali metal alkoxide, alkali metal carboxylate, or quaternary amine compound, may also optionally be employed herein. When employed, the quantity of catalyst used is sufficient to increase the rate of polymerization reaction. Precise quantities must be determined experimentally, but generally will range from about 0.01 to about 3.0 parts by weight per 100 parts polyol depending on the type and activity of the catalyst.

It is generally highly preferred to employ a minor amount of a surfactant to stabilize the foaming reaction mixture until it cures. Such surfactants advantageously comprise a liquid or solid organosilicone surfactant. Other, less preferred surfactants, include polyethylene glycol ethers of long chain alcohols, tertiary amine or alkanolamine salts of long chain alkyl acid sulfate esters, alkyl sulfonate esters and alkyl arylsulfonic acids. Such surfactants are employed in amounts sufficient to stabilize the foaming reaction mixture against collapse and the formation of large, uneven cells. Typically, from about 0.1 to about 5 parts of the surfactant per 100 parts by weight polyol are sufficient for this purpose. The optimum amount of surfactant required needs to be established by experimentation. However, it is to be noted that as the amount of surfactant increases the operating efficiency of the perforating agent may decline.

The foam obtained according to the disclosed process exhibits attractive dimensional and thermal insulation stability. The dimensional stability properties of the foam results from it having a perforated cell window content sufficient to minimize or overcome the tendency to shrink. Presently, Applicants are not aware of a convenient means of quantitatively measuring the perforated cell window content other than by observation using optical microscope techniques. Conventional air flow techniques, as used to determine the open-cell content of a foam, for example test procedure ASTM D 2856, do not provide a reliable means of measurement. Attractive thermal insulation properties are accorded to the foam by its fine cell structure. Advantageously, the foam has an average cell size of less than about 400, preferably less than about 350, and more preferably less than about 300 microns.

The polyurethane foam of this invention is of value for the construction industry where insulation board stock with both attractive dimensional stability and thermal insulation is highly desirable. The invention may also be used to provide polyurethane foam for semi-rigid applications such as for example sealant foam applications.

SPECIFIC EMBODIMENTS OF THE INVENTION

The invention is illustrated by way of the examples given hereinbelow, which are not to be considered as limiting the scope of the invention. Unless otherwise indicated all amounts given are parts by weight.

EXAMPLE 1

Foams 1 to 4 and Comparative Foam are prepared according to the formulation given in Table 1. Where reported the foam physical properties are measured in accordance with the mentioned test procedures: Compressive Strength—DIN 53421; Dimensional Stability—DIN 53431; and Thermal Conductivity—ASTM C 518.

Polyol A contains (parts by weight):
- 41.3 parts NIAX APP 315, a polyester polyol available from Union Carbide Corporation;
- 25.8 parts IXOL B251, a halogen-containing polyether polyol available from Solvay Cie;
- 6.2 parts VORANO1 RN 482, a sorbitol initiated polyether polyol available from The Dow Chemical Company;
- 5.2 parts VORANOL RA 640 an ethylenediamine initiated polyether polyol available from The Dow Chemical Company;
- 2.1 parts glycerine;
- 15.4 parts triethylphosphate (TEP);
- 5.0 parts melamine, average particle size 10 microns, available from DSM;
- 4.0 parts silicone-based surfactant blend, a 1:3 weight ratio of surfactant DC 193 available from Dow Corning and surfactant Tegostab B-8418 available from Th. Goldschmidt AG:
- 4.7 parts catalyst mixture containing a 17:5.5:1 weight ratio of a proprietary amine compound VORANOL C-52 available from The Dow Chemical Company; dimethylaminocyclohexane (DMCHA); and a proprietary amine compound NIAX A1 available from Union Carbide Corporation;
- 2.1 parts water;
- 3.0 parts FLUTEC PP1 available from Rhone-Poulenc and understood to be perfluorohexane;
- 11.8 parts isopentane.

Perforating Agents

TEFLON* MP 1100 particulate PTFE, average particle size 3 microns, $\geq 90\%$ of the particles have an average diameter of less 6 microns and at least 10% of the particles have an average diameter of less $\leq 1$ micron, and average surface area 8 m$^2$/g.

TEFLON* MP 1200 particulate PTFE, average particle size 3 microns, average surface area 3 m$^2$/g.

TEFLON* MP 1300 particulate PTFE, average particle size 15 microns, mean surface area 3 m$^2$/g.

TEFLON* MP 1500 particulate PTFE, average particle size 20 microns, mean surface area 3 m$^2$/g.

Polyol A is reacted with a crude polyphenyl polymethylene polyisocyanate VORANATE M220 available from The Dow Chemical Company. The polyisocyanate is present in an amount to provide for an isocyanate reaction index of 1.6. The reactivity of the system is observed by measuring its cream time (C.T.), gel time (G.T.) and tack-free time (T.F.T.).

Foams 1 to 4 show improved low temperature dimensional stability compared to Comparative Foam A which contains no perforating agent. Foams 1 to 4 also show the desirability of preparing foam in the presence of a perforating agent which has a smaller average particle size.

TABLE 1

| Parts by weight | Foam 1 | Foam 2 | Foam 3 | Foam 4 | A* |
|---|---|---|---|---|---|
| Polyol A | 126.6 | 126.6 | 126.6 | 126.6 | 126.6 |
| Polyisocyanate | 169 | 169 | 169 | 169 | 169 |
| TEFLON ™ MP 1100 | 1.0 | / | / | / | / |
| TEFLON ™ MP 1200 | / | 1.0 | / | / | / |
| TEFLON ™ MP 1300 | / | / | 1.0 | / | / |

TABLE 1-continued

| Parts by weight | Foam 1 | Foam 2 | Foam 3 | Foam 4 | A* |
|---|---|---|---|---|---|
| TEFLON ™ MP 1500 | / | / | / | 1.0 | / |
| particle size (microns) | 3 | 3 | 15 | 20 | / |
| surface area (m²/g) | 8 | 3 | 1 | 1 | |
| C.T./G.T./T.F.T. (seconds) | 11/40/57 | 11/41/55 | 10/39/51 | 11/40/58 | 11/38/51 |
| Density (kg/m3) | 29.4 | 29.1 | 29.0 | 28.6 | 29.8 |
| Cell Diameter (microns) | 393 | 256 | 387 | 360 | 348 |
| Compressive Strength | | | | | |
| (i) parallel to rise (kPa) | 160 | 147 | 154 | 147 | 154 |
| (ii) perpendicular-to-rise | 51 | 43.5 | 50 | 44 | 46 |
| Thermal Conductivity | | | | | |
| (i) Initial (mW/M.K) | 23.4 | 22.6 | 23.3 | 23.0 | 22.5 |
| (ii) Aged 4 days | 28.2 | 25.4 | 25.5 | 25.0 | 25.0 |
| Weight percent of perforating agent present in polymer | 0.34 | 0.34 | 0.34 | 0.34 | 0 |
| Dimensional Stability (% volume change) | | | | | |
| (i) −30° C. | −0.6 | −1.8 | −1.8 | −2.8 | −12.7 |
| (ii) +110° C. | −0.6 | −0.6 | −1.8 | −3.6 | +0.2 |

*Not an example of this invention

EXAMPLE 2 (FOAM 5)

The method of Example 1 is repeated with the following exceptions. TEFLON 30-N, an aqueous dispersion of particulate poly(tetrafluoroethylene) understood to contain about 60 weight percent solids having an average particle size of about 20 microns is employed as the perforating agent. Polyol A is replaced by a blend of Polyol B, polyester polyol NIAX APP 315 and Polyol C, a phenol-formaldehyde initiated polyoxyalkylene polyol having a hydroxyl equivalent weight of about 300. Polyols B and C are selected to provide a foam particularly susceptible to shrinkage in normal circumstances. Physical properties of the foam is reported in Table 2.

TABLE 2

| parts by weight | Foam 5 |
|---|---|
| Polyol B | 50 |
| Polyol C | 50 |
| DMCHA | 0.5 |
| NIAX A1 | 0.2 |
| Surfactant DC-193 | 2.0 |
| Water | 4.3 |
| Perforating Agent | 0.83 |
| Voranate M220 | 150 |
| C.T./G.T./T.F.T. (seconds) | 15/52/66 |
| Density (kg/m³) | 27.9 |
| Compressive Strength | |
| (i) parallel to rise (kPa) | 172 |
| (ii) perpendicular-to-rise | 115 |
| Thermal Conductivity, Initial (mW/M.K) | 29.3 |
| Weight percent of perforating agent present in polymer | 0.2 |
| Dimensional Stability (% volume change) | |
| (i) −30° C. | −0.6 |
| (ii) +110° C. | −1.2 |

The results presented in Table 2 demonstrate that the solid perforating agent can be conveniently introduced into the foaming process as an aqueous dispersion.

EXAMPLE 3 (FOAMS 6 TO 9, AND COMPARATIVE FOAM B)

The method of Example 2 is repeated, only in this case the perforating agents are (1)TEFLON MP 1500; and (2)TEFLON MP 1100. Comparative Foam B is prepared in the presence of particulate starch understood to have a particle size of about 10 microns and a critical surface free energy of 39 mJ/m². Physical properties of the foams are reported in Table 3.

The results presented in Table 3 demonstrate the difference in dimensional stability to be obtained with different perforating agents employed in various amounts. Comparative Foam B demonstrates that particulate starch can not confer the same degree of dimensional stability to a foam, even when used in superior amounts.

TABLE 3

| parts by weight | Foam 6 | Foam 7 | Foam 8 | Foam 9 | Foam B* |
|---|---|---|---|---|---|
| Polyol B | 50 | 50 | 50 | 50 | 50 |
| Polyol C | 50 | 50 | 50 | 50 | 50 |
| DMCHA | 0.6 | 0.6 | 0.6 | 0.6 | 1 |
| NIAX A1 | 0.2 | 0.2 | 0.2 | 0.2 | 0.2 |
| Surfactant DC-193 | 2 | 2 | 2 | 2 | 2 |
| Water | 4.6 | 4.6 | 4.6 | 4.6 | 4.6 |
| Perforating Agent 1 | 0.5 | / | 0.1 | / | / |
| Perforating Agent 2 | / | 0.5 | / | 0.1 | / |
| Starch | / | / | / | / | 1 |
| Voranate M220 | 150 | 150 | 150 | 150 | 150 |
| C.T./G.T./T.F.T. (seconds) | 15/49/60 | 16/50/66 | 16/47/58 | 17/50/63 | 14/38/48 |
| Density (kg/m³) | 26.2 | 26.1 | 26.1 | 26.0 | 27.1 |
| Compressive Strength | | | | | |
| (i) parallel to rise (kPa) | 144 | 173 | 128 | 141 | 149 |
| (ii) perpendicular-to-rise | 72 | 69 | 49 | 54 | 94 |
| Thermal Conductivity Initial (mW/M.K) | 24.7 | 26.1 | 24.5 | 24.1 | 23.8 |
| Weight percent of perforating agent present in polymer | 0.2 | 0.2 | 0.04 | 0.04 | 0.4 |
| Dimensional Stability (% volume change) | | | | | |
| (i) −30° C. | −0.6 | −0.6 | −1.0 | −1.0 | −1.2 |
| (ii) +110° C. | −43.6 | −9.4 | −57.6 | −57.9 | −74.2 |

EXAMPLE 4

The method of Example 2 is repeated, only in this case the perforating agent is FLUORINERT L-9901 available from 3M and understood to be a mixture of $C_{15}-C_{18}$ perfluorinated compounds having a boiling point of 215° C. Comparative Foams C and D, are prepared in the presence of FLUORINERT FC 104, available from 3M, and understood to be perfluorocarbon compound which has a boiling point of 101° C. and a critical surface free energy of about 10 mJ/m². The boiling point of FLUORINERT FC 104 is less than the observed maximum process temperature of about 160° C. Physical properties of the foams 10, 11 and Comparative Foams C and D are reported in Table 4.

The results in Table 4 demonstrate that a substance with a critical surface free energy of less than 23 mJ/n² and with a boiling point of substantially less than the maximum process temperature is unable to confer similar dimensionally stability to a foam prepared in the presence of a perforating agent according to this invention.

TABLE 4

| parts by weight | Foam 10 | Foam 11 | Foam C* | Foam D* |
| --- | --- | --- | --- | --- |
| Polyol B | 50 | 50 | 50 | 50 |
| Polyol C | 50 | 50 | 50 | 50 |
| DMCHA | 0.6 | 0.6 | 0.6 | 0.6 |
| NIAX A1 | 0.2 | 0.2 | 0.2 | 0.2 |
| Surfactant DC-193 | 2 | 2 | 2 | 2 |
| Water | 4.6 | 4.6 | 4.6 | 4.6 |
| Perforating Agent | 0.5 | 0.1 | / | / |
| FC 104 | / | / | 0.5 | 0.1 |
| Voranate M220 | 150 | 150 | 150 | 150 |
| C.T./G.T./T.F.T. (seconds) | 15/43/56 | 15/47/67 | 16/45/58 | 16/49/62 |
| Density (kg/m$^3$) | 26.9 | 26.3 | 25.7 | 26.0 |
| Compressive Strength | | | | |
| (i) parallel to rise (kPa) | 181 | 212 | 164 | 180 |
| (ii) perpendicular-to-rise | 114 | 101 | 64 | 60 |
| Thermal Conductivity Initial (mW/M.K) | 27.1 | 26.5 | 24.0 | 24.3 |
| Weight percent of perforating agent present in polymer | 0.2 | 0.04 | 0.2 | 0.04 |
| Dimensional Stability (% volume change) | | | | |
| (i) −30° C. | −0.4 | −0.2 | −1.0 | −0.6 |
| (ii) +110° C. | −1.2 | −0.4 | −75.9 | −77.9 |

*Not an example of this invention

What is claimed is:

1. A foamable polyurethane precursor composition comprising a polyurethane precursor, being a polyisocyanate or a substance containing a isocyanate-reactive hydrogen atoms, and a perforating agent characterized in that the perforating agent is present in from about 0.01 to about 2.0 percent based on total weight of precursor and agent present, and is a liquid polyfluorinated substance that has a critical surface free energy of less about 23 mJ/m$^2$ and having a boiling point greater than 130° C. and a molecular weight of at least 350.

2. The polyurethane precursor composition of claim 1 wherein said liquid perforating agent is a polyfluoro- or perfluorocarbon compound.

3. The polyurethane precursor composition of claim 1 where the precursor is an organic polyisocyanate.

4. The polyurethane precursor composition of claim 2 where the precursor substance containing isocyanate-reactive hydrogen atoms is a polyether polyol, polyester polyol, amine-terminated polyether or mixtures thereof.

5. A cellular polyurethane polymer containing perforated cell windows and which has a density of from about 10 to about 150 kg/m$^3$ prepared by reacting an organic polyisocyanate with a substance containing one or more isocyanate-reactive hydrogen atoms/molecule in the presence of a blowing agent and a perforating agent which has a critical surface free energy of less than 23 mJ/m$^2$ characterized in that:
   a) the blowing agent comprises water in an amount to provide for at least 50 mole percent of the blowing requirement; and
   b) the perforating agent is a liquid polyfluorocarbon or perfluorocarbon, with a boiling point at atmospheric pressure of at least 130° C. and a molecular weight of at least 350 and is present in from about 0.01 to about 0.6 percent based on total weight of the polyurethane polymer.

6. The polyurethane precursor composition of claim 1 wherein the polyfluorinated substance has a boiling point of at least 175° C. and is insoluble or only sparingly soluble in the precursor.

7. The polyurethane precursor composition of claim 6 wherein the polyfluorinated substance is a mixture of $C_{15-18}$ perfluorinated compounds.

8. The polyurethane precursor composition of claim 3 wherein the polyisocyanate is toluene diisocyanate.

9. The polyurethane precursor composition of claim 3 wherein the polyisocyanate is a methylene-bridged polyphenyl polyisocyanate.

10. The polyurethane precursor composition of claim 4 wherein the precursor is a polyether polyol having a hydroxyl equivalent weight of from about 50 to about 700 and containing from about 2 to about 8 hydroxyl groups per molecule.

11. The polyurethane precursor composition of claim 4 wherein the precursor is a polyester polyol.

12. The polyurethane precursor composition of claim 11 wherein the polyester polyol has a melting point of from about 50° C. to about 115° C.

13. The polyurethane precursor composition of claim 4 which further comprises from about 0.5 to about 15 parts water per 100 parts by weight of polyol present.

* * * * *